United States Patent (10) Patent No.: US 9,524,322 B2
Yagoub et al. (45) Date of Patent: Dec. 20, 2016

(54) COMPOSITE ACTIVE REPORTS

(71) Applicant: Oracle International Corporation, Redwood Shores, CA (US)

(72) Inventors: Khaled Yagoub, San Mateo, CA (US); Abdul Munir, San Mateo, CA (US); Cecilia Gervasio Grant, Belmont, CA (US); Karl Dias, Foster City, CA (US); Benoit Dageville, Truckee, CA (US)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 14/040,354

(22) Filed: Sep. 27, 2013

(65) Prior Publication Data

US 2015/0006511 A1 Jan. 1, 2015

Related U.S. Application Data

(60) Provisional application No. 61/841,034, filed on Jun. 28, 2013.

(51) Int. Cl.
G06F 17/30 (2006.01)

(52) U.S. Cl.
CPC .................. *G06F 17/30554* (2013.01)

(58) Field of Classification Search
None
See application file for complete search history.

(56) References Cited

U.S. PATENT DOCUMENTS

| | | | |
|---|---|---|---|
| 5,838,906 A | 11/1998 | Doyle et al. | |
| 6,006,232 A * | 12/1999 | Lyons | |
| 6,009,422 A * | 12/1999 | Ciccarelli | G06F 17/30439 |
| 6,427,149 B1 * | 7/2002 | Rodriguez et al. | 709/219 |
| 6,539,370 B1 * | 3/2003 | Chang et al. | |
| 7,127,444 B2 * | 10/2006 | Peake et al. | |
| 7,599,985 B2 | 10/2009 | Doyle et al. | |
| 7,831,621 B1 * | 11/2010 | Banks | G06F 21/6227 |
| | | | 707/790 |
| 7,945,581 B2 * | 5/2011 | Bayliss et al. | 707/770 |
| 2008/0154909 A1 * | 6/2008 | Dam | G06Q 10/06 |
| 2009/0024414 A1 * | 1/2009 | Mansour | G06F 19/322 |
| | | | 705/3 |
| 2011/0035744 A1 * | 2/2011 | Bhatia | G06F 17/30893 |
| | | | 717/174 |
| 2011/0197122 A1 * | 8/2011 | Chan et al. | 715/234 |
| 2013/0031053 A1 * | 1/2013 | Tobin et al. | 707/635 |

\* cited by examiner

*Primary Examiner* — James Trujillo
*Assistant Examiner* — Aida Tessema
(74) *Attorney, Agent, or Firm* — Hickman Palermo Becker Bingham LLP; Daniel D. Ledesma

(57) ABSTRACT

Techniques for generating and processing composite active reports are provided. An active report is a report that can be displayed and interacted with at a client device even though the client device is not connected to a database from which data for the report originates. A composite active report is an active report that includes multiple reports embedded in the same file. Each report in a composite active report may be separately compressed to allow a client device to decompress a report on demand. A composite active report may include, for each report indicated in the composite active report, executable identification data that is used to retrieve, from a remote source, an executable that is used to generate, based on report data of the report, display data, which is displayed on a computer display of a client device.

28 Claims, 6 Drawing Sheets

COMPOSITE ACTIVE REPORTS

PRIORITY CLAIM

This application claims benefit of U.S. Provisional Application No. 61/841,034, filed on Jun. 28, 2013, the entire contents of which are hereby incorporated by reference as if fully set forth herein, under 35 U.S.C. §119(e).

FIELD OF THE DISCLOSURE

Embodiments relate to generating reports that include database information and, more particularly to, generating a composite report that includes multiple reports that are viewable and navigatable even though a connection to a database from which the reports are based is not established.

BACKGROUND

Developers of databases provide customers the ability to manage their respective databases. This ability to manage is enabled through management software (including user interfaces) that allows a customer (or, more specifically, a database administrator (DBA)) to interact with a database, view how the database is performing, and take actions to alleviate problems and plan for contingencies. Such database management software may allow a DBA to generate a report that indicates different performance metrics associated with one or more databases of an enterprise. Example performance metrics may include CPU utilization, memory utilization, network utilization, number and types of queries in one or more workloads, etc. A DBA may use a report to determine that performance has degraded and to identify what is causing the performance degradation.

Many times, a DBA is unable to identify a source or cause of a database problem, whether through lack of sufficient training or complexity of the database problem. In such situations, the DBA may rely on experts of the database involved to help resolve the database problem. However, those experts typically do not have access to the database. In other words, the experts are "offline" relative to the database.

One possible approach to address this offline problem is for the DBA to generate a report, cause the report to be displayed on a computer screen, take a screenshot of the screen, save the screenshot to a particular location (e.g., a folder) on the DBA's computer, open up an email application, compose a new email message, attach the saved screenshot to the new email message, and send the message to an expert. Clearly, such an approach requires many manual steps. Furthermore, the expert only has access to a single screenshot. Many times, an expert needs to be able to view additional data that is not displayed in the screenshot. For example, an expert may need to reorganize a list, adjust a slider to view additional data, or click on a link to another (related) report in order to determine the cause of a database problem. With a screenshot, none of these options is possible.

One way to address this problem is for the DBA to generate numerous reports, take screenshots of each report, and send the screenshots to an expert. However, such an approach does not address the problem of the DBA having to perform many manual steps. Also, the DBA does not know ahead of time which report will be most useful to the expert. Thus, the DBA may take numerous screenshots that will never be used by the expert. Also, for some reports, the number of possible views within a single report (e.g., number of tabs or ways in which a list may be reordered) may be significant, requiring the DBA to take several (potentially useless) screenshots.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for allowing users to view multiple database reports even though the users may not have a connection to a database from which the reports were generated. In other words, the users are working in an "offline mode." An "active report" is a report that can be displayed and interacted with at a client device even though the client device is not connected to a database from which data for the report originates. A "composite active report" is an active report that includes multiple reports embedded in the same document or file. Each report in a composite active report may be separately compressed to allow a client device to decompress a report when the report is needed (i.e., "on demand"). A composite active report may include, for each report indicated in the composite active report, executable identification data that is used to retrieve an executable that is used to generate display data for the report. In this way, an "offline" user or expert may use a browser to view and navigate among multiple database reports.

System Management

Figure 1:
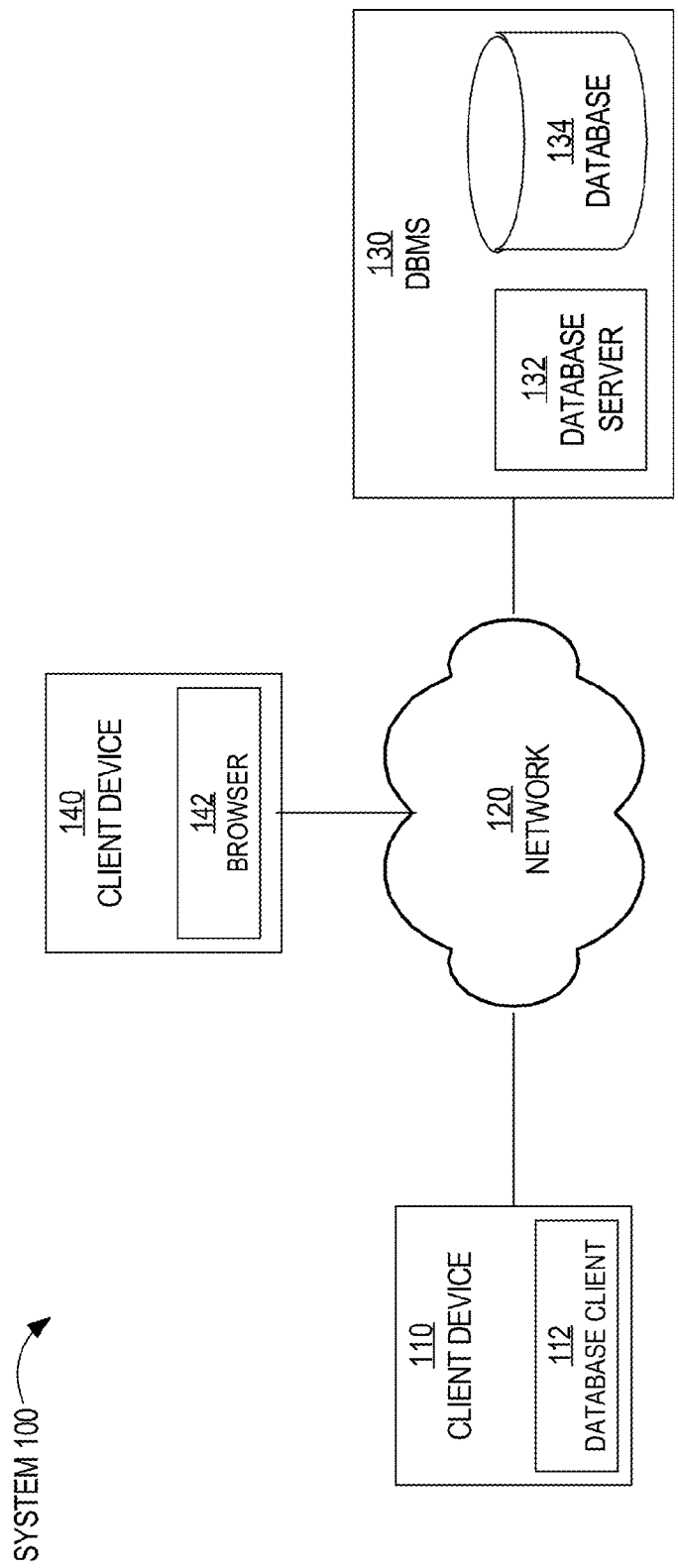
FIG. 1 is a block diagram that depicts an example system for generating and processing composite active reports, in an embodiment.

FIG. 1 is a block diagram that depicts an example system 100 for generating and processing composite active reports, in an embodiment. System 100 includes a client device 110, a network 120, a database management system 130, and a remote client 140.

Client device 110 is a computing device that includes a database client 112 for interacting with DBMS 130. "Interacting" may involve requesting data from DBMS 130, storing the requested data locally and/or remotely relative to client device 110, and displaying at least a portion of the data on a computer screen of the computing device. Examples of client device 110 include a laptop computer, a desktop computer, a tablet computer, and a smartphone.

Database client 112 may be hardware logic, software logic, or a combination of hardware and software logic. For example, database client 112 may be a software application that executes on client device 110 and that is configured to submit requests and commands to DBMS 130.

Before requesting data from or accessing data in DBMS 130, the user of client device 110 or database client 112 itself may be required to first authenticate with respect to DBMS 130, for example by providing a username and password to DBMS 130.

Although only one client device 110 with database client 112 is depicted, system 100 may include multiple such clients that are communicatively coupled to DBMS 130. The other clients may not include certain logic that performs operations relative to DBMS 130. For example, database client 112 may have certain access rights that other database clients do not. Thus, for example, while all database clients may run queries against a certain set of database objects managed by DBMS 130, only database client 110 may submit queries to DBMS 130 regarding performance metrics of DBMS 130.

Network 120 may be implemented by any medium or mechanism that provides for the exchange of data between client device 110 and DBMS 130 and between client device 110 and client device 140. Examples of network 120 include, without limitation, a network such as a Local Area Network (LAN), Wide Area Network (WAN), Ethernet or the Internet, or one or more terrestrial, satellite or wireless links. In a related embodiment, the network that facilitates exchange of data between client device 110 and DBMS 130 is different than the network that facilitates exchange of data between client device 110 and client device 140.

DBMS 130 includes a database server 132 and a database 134. Although only a single database server 132 and a single database 134, system 100 may include multiple database servers and/or multiple distinct databases that are managed by one or more database servers.

Also, although database server 132 is depicted as executing on a single computing device, database server 132 may be distributed among multiple computing devices, each of which have access to database 134.

Client device 140 is a computing device that includes a browser 142 that is configured to process documents, such as HTML documents. Examples of browser 142 include Microsoft's Internet Explorer, Mozilla Firefox, and Google Chrome. Examples of client device 140 also include a laptop computer, a desktop computer, a tablet computer, and a smartphone. After client device 140 receives a CAR, browser 142 opens the CAR and causes report data from the CAR to be displayed through browser 142 on a computer screen of client device 140.

Database Management

In an embodiment, database client 112 is database management software that exposes a set of database features in the format of a web-based user interface (UI). Each database feature exposes various aspects of the performance of a database, allowing a DBA to monitor the performance. Examples of database features include SQL Monitoring Main, SQL Monitoring List, Active Session History (ASH) (which shows activity of sessions in the database), Automatic Workload Repository (AWR) (which is a repository of database performance data), Automatic Database Diagnostic Monitor (ADDM), Top SQL (which shows a list of SQL statements that use the most resources in the database along with resource consumption for each SQL statement), and SQL Details (which shows detailed information about a single SQL statement, such as resource usage, activity, execution plan(s), and monitored executions). The database may be architected to include in-memory structures that track key performance statistics.

Through database client 112, users, such as DBAs, can view and browse through the set of database features, i.e., navigate from one database feature to another by clicking on (HTML) links. Each database feature queries the database to retrieve data and then uses a dedicated (i.e., specific to the database feature) set of binary, byte-code, or text files (e.g., Java classes, .swf files, JavaScript, etc.) to display the information in a browser of database client 112.

Contents of a Composite Active Report

A composite active report (CAR) is a file or document that includes report data for multiple database reports. In an embodiment, a CAR is stored as an HTML (HyperText Markup Language) file, which allows a browser to open the CAR and cause the report data of each report to be processed. A user is able to navigate among multiple reports of the CAR even though the browser is not connected to the database from which the reports were generated. Because of the ubiquitous nature of browsers, practically every person with access to a computer can view and navigate a CAR that is accessible to the computer.

Examples of two CARs are found in Appendix A and Appendix B. In both appendices, actual compressed data is not included. Instead, "[compressed data]" is included in locations where the actual compressed data would have been located.

In an embodiment, the report data for each report in a CAR is reflected in XML. Thus, a CAR may be considered a series of separate XML data, all within common HTML tags.

In an embodiment, report data for each report is associated with executable identification data that is used to retrieve an executable file that is configured to generate a display based on the corresponding report data. The executable identification data is processed by an executable, executing on the client device, that was retrieved from a remote location. The executable identifies the executable identification data, identifies a location where the appropriate executable is located, and retrieves that executable, which will be used to process certain report data and cause a user interface to be displayed within a browser (e.g., browser 142).

If a CAR includes report data for two reports that are of different types (i.e., different database features were used to generate the reports), then two different executables may be identified and retrieved (at different times) to process the respective reports when the CAR is processed. In other words, different executables are designed for processing different kinds of report data. For example, one executable may be for processing report data for one database feature (e.g., SQL Monitor Main) and another executable may be for processing report data for another database feature (e.g., SQL Monitor List).

In the examples reflected in the appendices, the report data for each report in each CAR is compressed. Because the result of some compression techniques is zeros and ones, the compressed report data may be converted to another format, such as ASCII. In an embodiment where report data is compressed, an executable for that report data is configured to decompress the compressed report data (at runtime) to generate decompressed report data, which the executable will then process to generate a user interface within the browser. Additional persistent storage to store the decompressed report data is not required.

In an embodiment, individually compressing each report data for each report allows decompression of individual sets of report data to be performed on demand. In other words, when one report is decompressed, one or more other reports remain compressed until input is received that indicates user selection of the one or more other reports.

Generating a Composite Active Report

In an embodiment, user input initiates creation of a CAR. For example, a user, interacting with a user interface provided by database client 112 that is connected to DBMS 130, provides input that, when processed by DBMS 130, causes a composite active report to be generated. The input may involve the user selecting, within the user interface, a button or drop down menu option that refers to "Create A Composite Active Report" or "Save Active Report."

The reports in a CAR may have been individually selected (or affirmed) by a user or automatically selected. For example, the user individually selects one or more database features and causes a report to be generated for each and included in the CAR. At the time of input that a CAR is to be generated, the user interface may not be depicting report data generated by any database feature. As another example, the user does not provide any input other than an indication that a CAR is to be generated. In response to the input, database client 112 may store data that indicates a "standard" set of reports that are to be included in a CAR.

Figure 2:
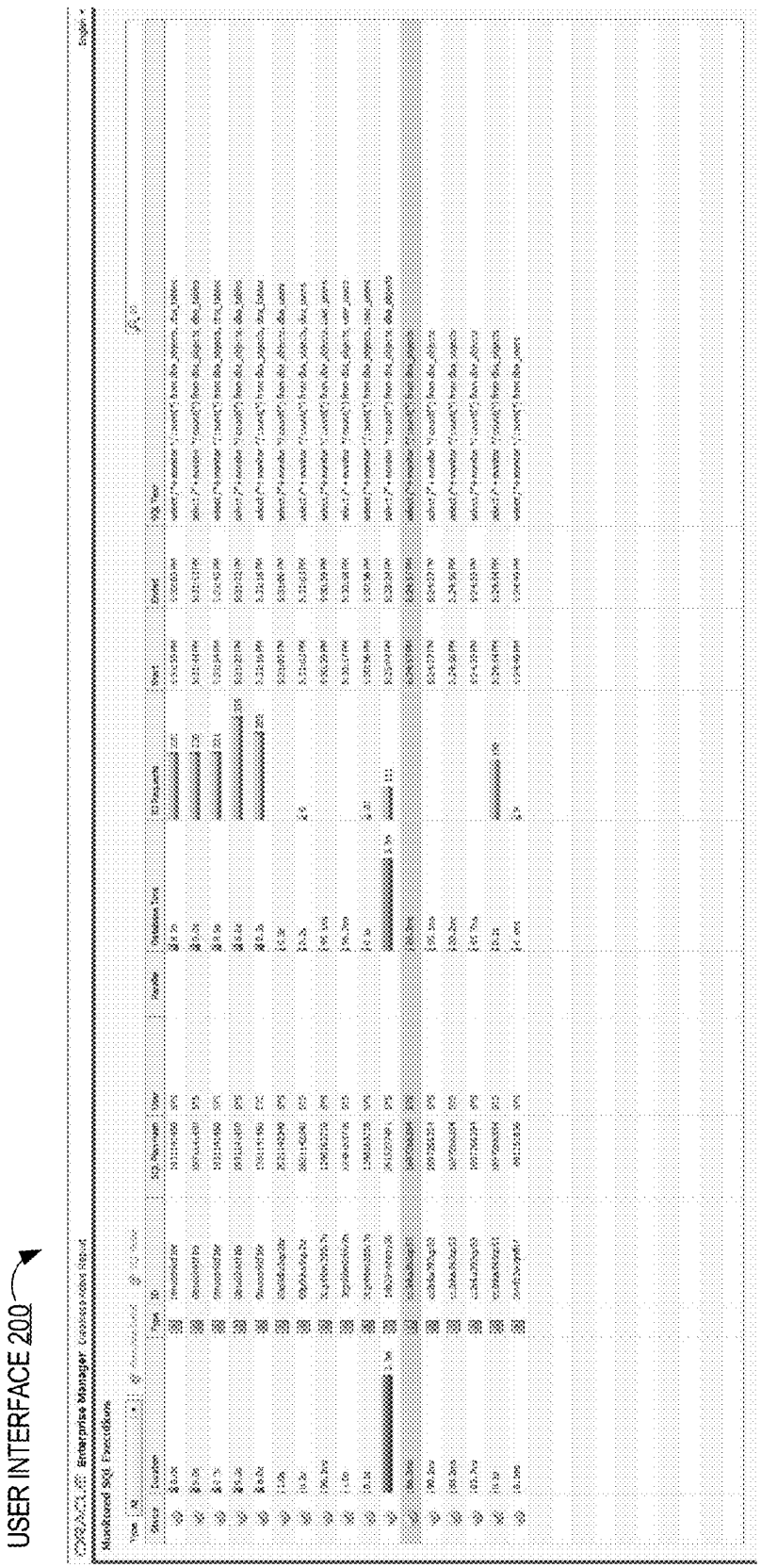
FIG. 2 is a block diagram that depicts a user interface for a report, in an embodiment.

Alternatively, a CAR may include a report that has been selected by a user and another report that has been selected automatically. For example, the user interface provided by database client 112 may be depicting report data generated by one or more database features at the time the user provides input that a CAR should be generated. Thus, the data that is currently displayed to the user may dictate which reports are automatically selected for inclusion in the CAR. FIG. 2 is a block diagram that depicts an example user interface 200 displayed on a client device (e.g., client device 110). If a user provides input that indicates a CAR is to be generated while user interface 200 is displayed, then database client 112 may determine that a report for each of the top five SQL executions in terms of the number of I/O requests is to be included in the CAR. One or more criteria other than I/O requests may be used to determine whether a report for certain SQL executions will be included in a CAR. Such criteria are indicated in user interface 200 and include database time (which refers to time spent in the database), duration (which refers to how long a statement has been running), and start time. If parallel slave processes are used to process a SQL statement and the database time is accrued by each of the slave processes, then the database time may be much higher than duration. If a SQL statement causes a large number of rows to be retrieved from a database and a mid-tier client processes the result set, then a scenario may be: (1) fetch x rows (accrues database time); (2) mid-tier processes the x rows; (3) fetch next x rows (accrues database time); (4) mid-tier processes the next x rows; etc. In this case, the duration will be larger than database time.

In response to receiving user input that indicates creation of a CAR, database client 112 may prompt the user to select one of multiple options, such as "Basic," "Typical," and "All." "Basic" may indicate a single report or relatively few reports and store them into a CAR. "Typical" refers to a CAR that includes more reports than "Basic" and may include the top N "sub-reports," such as for the top 10 SQL executions in terms of duration. "All" refers to a CAR that includes all possible reports to which may be navigated from a currently displayed report or from a particular report (such as SQL Monitor Main), which may have been "hardcoded" or established by a user (such as a DBA). Database client 112 may allow a user to establish a default "starting" report, from which other reports are automatically selected.

Database client 112 may also provide an interface that allows a user to indicate a destination to which a CAR (whether or not it has been generated) will be sent. The destination may be an email address or a storage location that is accessible by a second user that is to review the CAR offline (i.e., not connected to the database). The second user may be a user of client device 140 (in FIG. 1). Alternatively, a user at client device 110 initiates generation of a CAR to allow the user to review the CAR offline if the user knows s/he may be working offline when the user plans to review the CAR.

Example Generating Process

Figure 3:
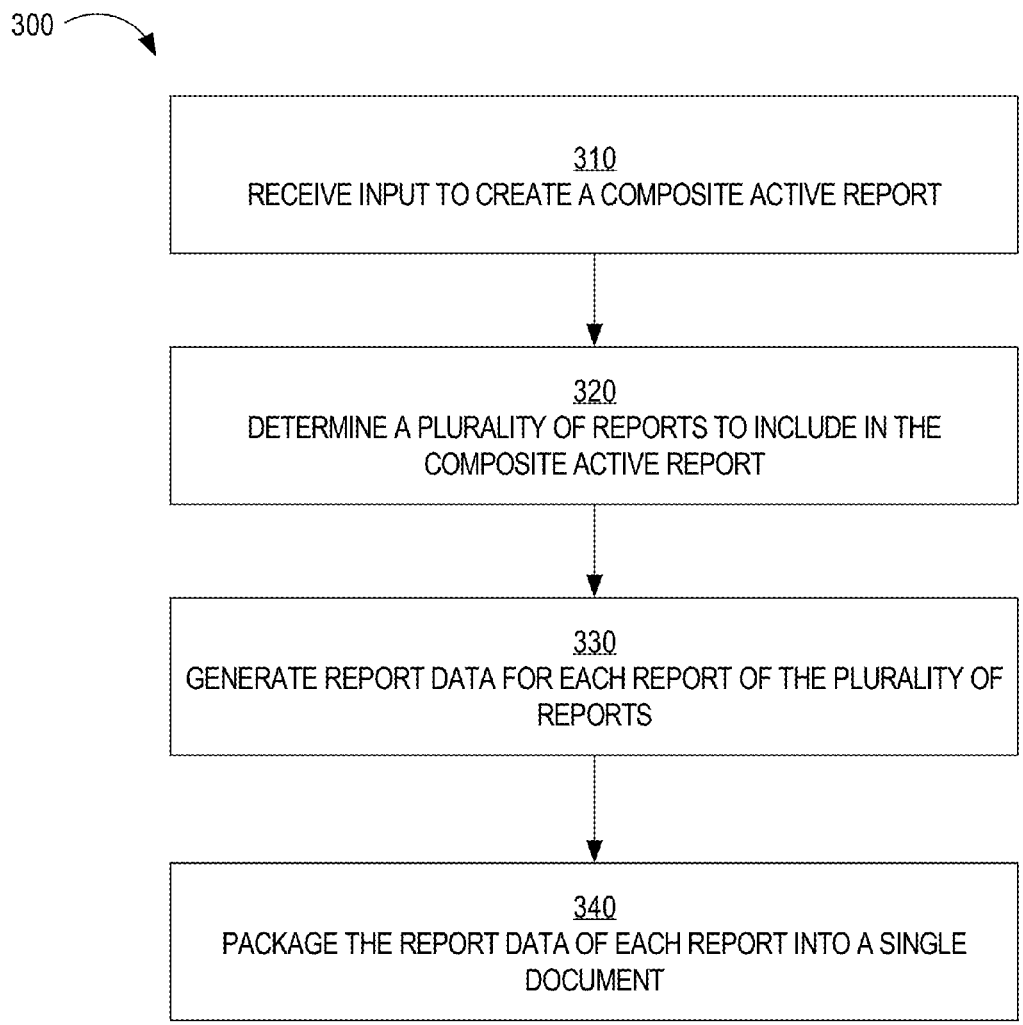
FIG. 3 is a flow diagram that depicts a process for generating a CAR, in an embodiment.

FIG. 3 is a flow diagram that depicts a process 300 for generating a CAR, in an embodiment. Process 300 may be performed by database client 112, database server 132, or a combination of database client 112 and database server 132.

At block 310, input is received that indicates creation of a CAR. The input may be user selection of a button, link, or menu option. Alternatively, the input may be through a command line (i.e., a non-UI tool), such as SQL *Plus. Alternatively, the input may be voice input that instructs database client 112 to create a CAR.

At block 320, a plurality of reports that are to be included in the CAR are determined. The input received in block 310 may indicate which reports to include in the CAR or only a subset of the reports to include in the CAR. Alternatively, at least one report is determined based on the current context (e.g., which report a user of client device 110 is currently viewing) while the remaining reports are automatically identified based on the one report.

At block 330, for each report of a plurality of reports that are determined at block 310, report data is generated for that report. Each report corresponds to a database feature and the corresponding report data may be formatted in XML. A set of reports may correspond to the same database feature (but a different set of report data) while one or more other reports may correspond to a different database feature. Block 330 may involve database client 112 sending, to database server 132, one or more messages to DBMS 130 to retrieve report data for each report of a CAR. A single message from database client 112 may include all reports that are to be included in the CAR and may indicate how one report relates to another. For example, one or more reports may be "nested" under another report. Such "nested" reports may be referred to as "child" or "sub-" reports. Alternatively, each message from database client 112 indicates a different report that is to be included into a particular CAR.

If a particular report allows a user to navigate to another report, then the report data for the particular report includes link data that is used to identify the other report. The other report may be a "child" report of the particular report or a "sibling" report of the particular report. If the other report is a child report, then the report data for the child report is nested within the report data of the particular report (see Appendix A where the second report data is nested within the report data of the first report). If the other report is a sibling report, then the report data for the sibling report is not nested within the report data for the particular report (see Appendix B wherein the third report data is not nested within the report data of the second report).

The link data to a particular report may comprise a report identifier that uniquely identifies the particular report relative to all other reports in a CAR file. The link data may be generated by database client 112 or database server 132.

At block 340, the report data for each report is packaged within a single file or (e.g., HTML) document. Block 340 also involves including executable identification data that will be used to retrieve an executable file from a remote server. Thus, each report in a CAR is associated with a different set of XML data and different executable identification data. The executable identification data associated with a report may comprise data that identifies the database feature that corresponds to the report and/or a database version that identifies a version of database server 132 that generated the report data for the report. Such version information may be necessary because different versions of database server 132 may (a) format report data differently than other versions and/or (b) include additional information that previous versions do not recognize. Thus, identification of the appropriate database feature and the version for a report act as executable identification data to allow the appropriate executable file for that report to be retrieved when the CAR is processed.

In an embodiment, two or more reports in a CAR are associated with the same executable file. For example, a report for SQL Monitor Main may require one executable while each of its links to multiple individual SQL Monitor Detail reports may share the same SQL Monitor Detail executable. The executable for the SQL Monitor Detail reports will cause different data to be displayed based on the different reports in the CAR.

The CAR also includes executable code (e.g., JavaScript code) that causes an initial executable file to be retrieved from a remote server. This initial executable file is used to generate mapping data that associates, for each report, executable identification data with corresponding report data, which is described in more detail below.

Block 340 may also involve compressing report data and including the compressed report data in a CAR. If report data for a report is compressed, then database client 112 (or database server 132) may include data, within the CAR, that indicates that the report data is compressed and, optionally, which compression technique was used to compress the report data.

Block 330 may involve first generating report data for all reports that are to be included in a CAR (without including any report data in the CAR) and then block 340 involves including all the report data in the CAR.

Blocks 330 and 340 may be repeated multiple times, once for each report. For example, one iteration of blocks 330-340 may involve (1) database server 132 generating report data for a single report and (2) database server 132 including the report data and appropriate executable identification data into a CAR. Thus, these series of steps are repeated for each report that is to be included in the CAR. Later, database server 132 sends the CAR to database client 112 (or another destination). In a related embodiment, blocks 330-340 may involve (1) database server 132 generating report data for a single report and sending the report data to database client 112 and (2) database client 112 including the report data and appropriate executable identification data into a CAR.

Transmitting a Composite Active Report

After the CAR is generated, the CAR may be transmitted to a destination. As noted above, database client 112 may automatically transmit a CAR to a particular destination indicated by a user prior to the CAR being generated. Alternatively, database client 112 automatically stores the CAR in a particular location (e.g., in local volatile or non-volatile memory) and the user is responsible for sending the CAR to a particular destination (e.g., attaching the CAR to an email or placing the CAR into a DropBox account, which may be shared by one or more other users). Because a CAR file can be processed by practically every commercial browser, any client device with a browser may open the CAR file and navigate among the reports reflected therein, even though the client device is not connected to DBMS 130, from which the reports originate.

Processing a Composite Active Report

Figure 4:
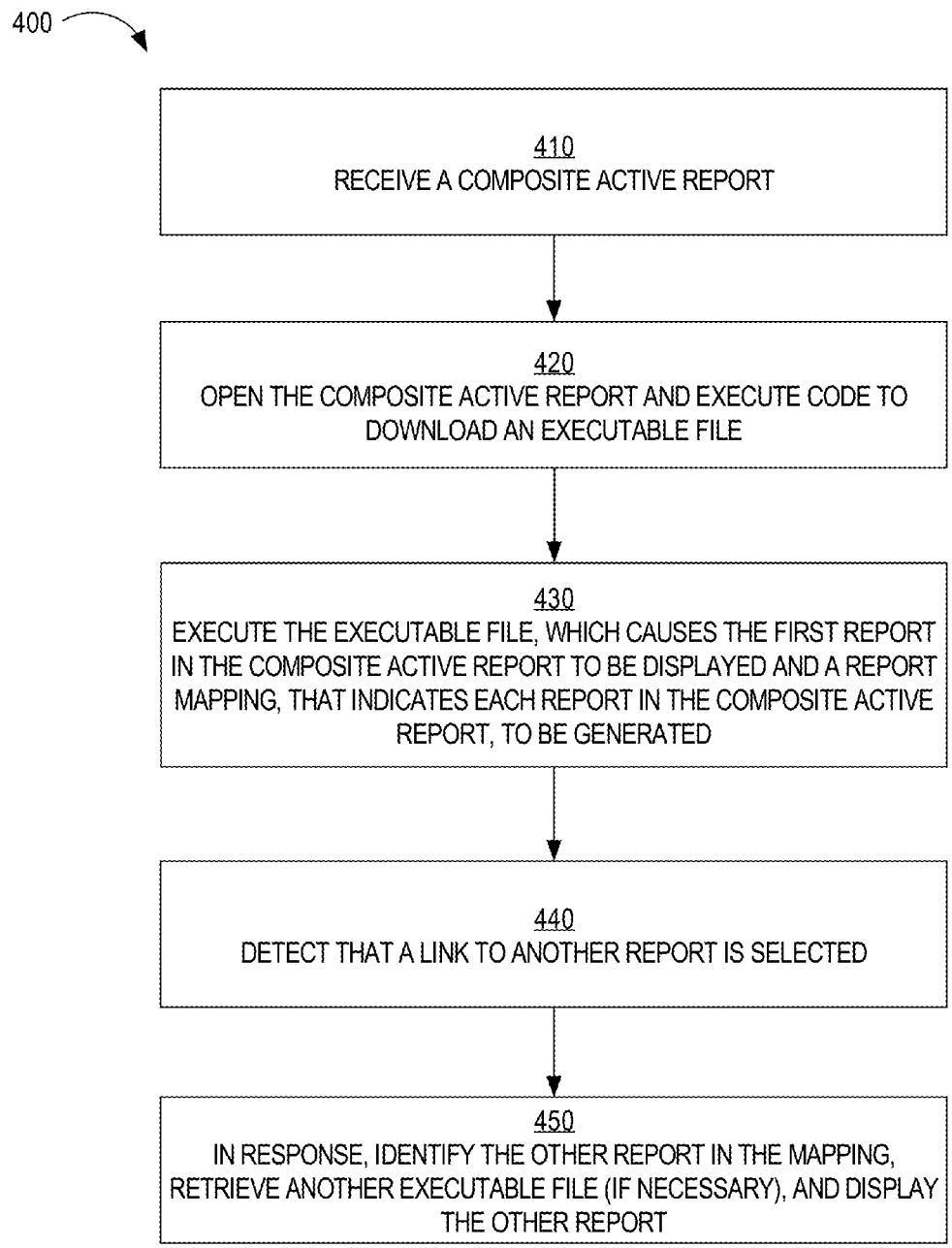
FIG. 4 is a flow diagram that depicts a process for processing a CAR, in an embodiment.

FIG. 4 is a flow diagram that depicts a process 400 for processing a CAR, in an embodiment. Process 400 may be performed at client device 140 of FIG. 1.

At block 410, a CAR file is received. For example, client device 110 may send, over network 120 to client device 140, a message that includes the CAR or indicates a location from where the CAR may be retrieved. As another example, client device 110 or DBMS 130 sends a (e.g., email) message to an email account of a user of client device 110. Later, the user operates client device 140 and instructs client device 140 to retrieve the CAR and process (e.g., "open") the CAR.

At block 420, a browser (e.g., browser 142) opens the CAR file and processes executable code (e.g., JavaScript) within the CAR file. The executable code causes a link within the CAR file to be identified and an executable file from the source identified by the link to be retrieved. In the example of Appendix A, the link is "http://download.oracle.com/otn_software/" and the executable code is within the
"script" tags:

```
<script language="javascript" type="text/javascript">
<!--
    var version = "12.1.0.2.0";
        document.write('<script language="javascript"
        type="text/javascript" ' +
            'src="emviewers/scripts/activeReportInit.js?' +
            Math.floor((new Date( )).getTime(
            )/(7*24*60*60*1000)) +
                '"></' + 'script>');
-->
</script>
</head>
<body onload="sendXML( );">
    <script type="text/javascript">
        writeIframe( );
    </script>
    <script id="fxtmodel" type="text/xml">
```

This script causes a message to be sent to a network service (for example, Oracle Technology Network (OTN)), which message causes the script "activeReportInit.js" to be executed. Execution of the latter script determines which executable needs to be sent to client device 140 for execution.

At block 430, the executable file is executed. For example, browser 142 executes the executable file, which is configured to read data about each report in the CAR file. Execution of the executable file causes a mapping to be generated (referred to herein as the "report mapping"). Example implementations of the report mapping include a table, a two-dimensional array, and a linked list. The report mapping includes multiple associations, each associating metadata of a report with the actual report data, which may be compressed initially. The report mapping is used by subsequent executables when a user (e.g., of client device 140) selects a different report.

Metadata of a report may include multiple types of information, examples of which include: (a) a report identifier that uniquely identifies the report relative to all other reports in the CAR file; (b) database feature identification data that identifies a database feature that corresponds to the report; (c) database version information that indicates a particular database version (e.g., 10gR2, 11gR1, 12cR1); and (d) compression data that indicates whether the corresponding report data is compressed and, if so, which compression technique was used. In an embodiment, the type of compression is not indicated if it is known that only one type of compression will be used, if at all.

The database feature identification data and/or database version information may be used by an executable to retrieve the appropriate executable file that is configured to process the corresponding report data. Such information may be used to form a URL that identifies a resource, which may be located at the same remote server as the initial executable retrieved in block 420.

In a related embodiment, the executable file that is initially retrieved and executed within browser 142 is not used to process the first report indicated in the CAR file. Instead, the initial executable file automatically retrieves an executable file for the first report to be retrieved and executed within browser 142. In this way, the initial executable file is responsible for generating the report mapping and then causing the appropriate executable file for the first report to be retrieved.

Block 430 also includes generating, based on executing an executable file (whether the initial executable file or a subsequent executable file), a user interface based on the first report indicated in the CAR file or in the report mapping. An example of such a user interface is user interface 200 of FIG. 2. The report reflected in user interface 200 corresponds to the database feature "SQL Monitoring Main." The report includes information about multiple SQL executions, such status, duration, type, an identifier (ID), a hash (or database ID for the execution plan of a SQL statement(s)), a user, database time, number of I/O requests, start time, and end time.

The report reflected in user interface 200 is dynamic in that the data displayed in user interface 200 may change. For example, user interface 200 includes a drop down menu to allow a user to view a subset of the SQL executions. Also, user interface 200 includes a search field to allow a user to search for a particular SQL execution based on ID. Additionally, one or more fields or columns in the report may be selectable, which causes user interface 200 to be updated to indicate a different ordering of the SQL executions. The report may also include data tips or tool tips for the columns that give the user additional information.

User interface 200 also includes selectable links for five specific SQL executions. The links are generated by executing the executable file and are based on link data within report data of the first report. The link data is based on the available reports in the report mapping. The link data may have been included by database client 112 or database server 132 during process 200 when the CAR file was being generated.

At block 430, if the report data for the first report is compressed, then, when generating a user interface based on the report data, the report data is first decompressed. Such decompression may be performed without compressing the report data for any other report in the CAR file. In this way, decompression occurs "on demand."

At block 440, a link to a different report is selected. Block 440 involves a user at client device 140 providing input that indicates selection of a link displayed in the user interface of the first report.

At block 450, in response to selection of the link, the executable file for the currently displayed report detects the selection, identifies the report associated with the selected link, identifies (within the report mapping) the association associated with the report, and, if necessary (e.g., if the current executable file is not configured to process the selected report), causes an executable file that corresponds to the report to be retrieved and executed within browser 142. The retrieved executable file processes the report data included in (or referenced by) the identified association in the report mapping. The processing causes another user interface for the selected report to be displayed within browser 142. An example of such a user interface is found in FIG. 5.

Figure 5:
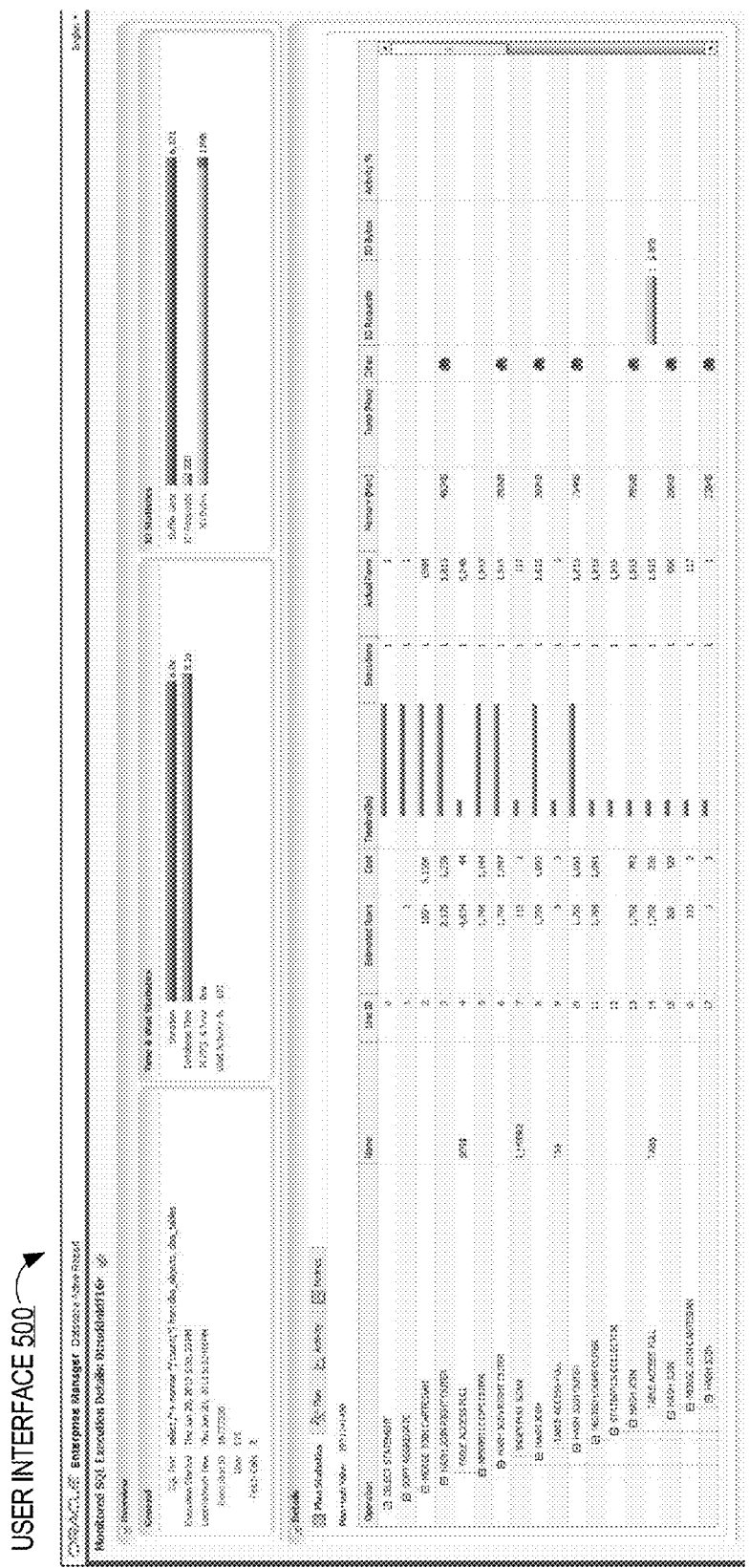
FIG. 5 is a block diagram that depicts a user interface for a report that is included in a CAR, in an embodiment.

FIG. 5 is a block diagram that depicts a user interface 500 of a particular report. In this example, the particular report is a child report of the report reflected in user interface 200. User interface 500 includes additional details about a specific SQL execution, including additional I/O statistics, the SQL text, details about specific operations that were executed to process the SQL query, including how long each operation took to finish, an estimated number of rows per operation, a cost of each operation, and an actual number of rows required by each operation. The details portion of user interface 500 allows, through the "Plan" tab, a user to view a graphical tree that represents each operation executed in the SQL execution and how the operations relate to each other. The "Activity" tab of the details portion allows a user to view CPU activity over time. The "Metrics" tab of the details portion allows a user to view CPU usage over time, memory usage for multiple types of memory over time, I/O throughput over time, and I/O requests over time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
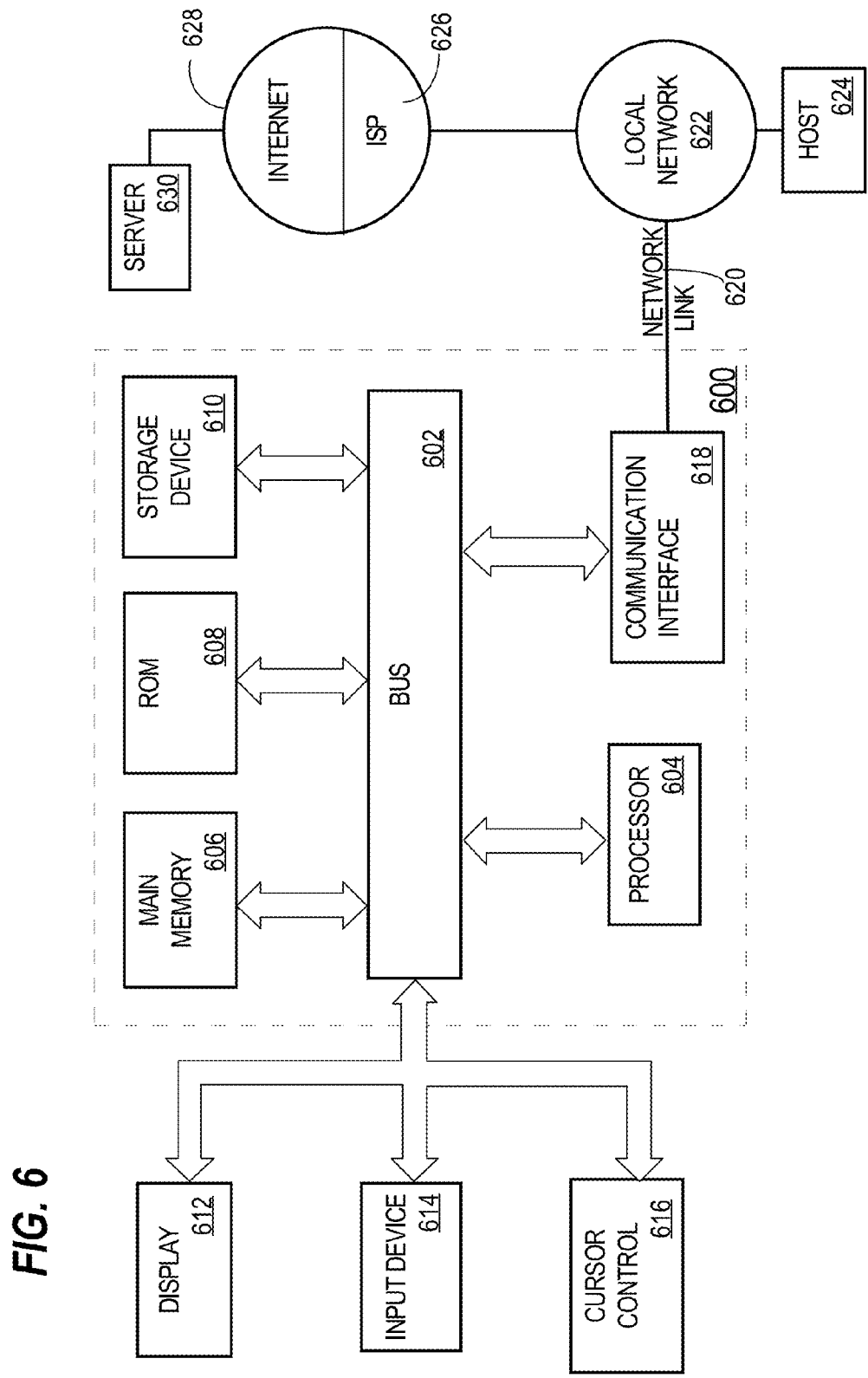
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, at a database system, a request to generate a composite report based on data stored in a database of the database system;
in response to receiving the request, for each report of a plurality of reports:
retrieving, from the database, report data for said each report;
storing the report data for said each report in a particular file;
storing, in the particular file, in association with the report data for said each report, executable identification data that identifies a location for a client device to retrieve, over a network, an executable that is to be executed by the client device that is remote relative to the database system and that is configured to process the report data of said each report to display user interface data for said each report;
wherein the particular file includes the report data for each report of the plurality of reports;
wherein the particular file is to be processed by the client device that is not connected to the database system;
wherein the method is performed by one or more computing devices.

2. The method of claim 1, wherein storing the report data for said each report in the particular file comprises:
compressing first report data for a first report of the plurality of reports to generate first compressed report data;
storing the first compressed report data in the particular file;
compressing second report data for a second report of the plurality of reports to generate second compressed report data that is different than the first compressed report data;
storing the second compressed report data in the particular file.

3. The method of claim 1, wherein storing the executable identification data comprises:
storing, in the particular file, in association with first report data for a first report of the plurality of reports, first executable identification data that identifies a location to retrieve a first executable that is configured to process the first report data;
storing, in the particular file, in association with second report data for a second report of the plurality of reports, second executable identification data that identifies a location to retrieve a second executable that is different than the first executable and that is configured to process the second report data.

4. The method of claim 1, wherein:
the plurality of reports includes a first report that corresponds to a first database feature;
the plurality of reports includes a second report that corresponds to a second database feature that is different than the first database feature.

5. The method of claim 4, wherein a particular report of the plurality of reports includes performance-related data regarding one or more of:
a plurality of monitored SQL executions, specific operations performed within a single monitored SQL execution, a plurality of database sessions, a plurality of SQL statements that use the most resources in the database, or a single SQL statement where the performance-related data includes two or more of resource usage, activity, execution plans, or monitored executions of the single SQL statement.

6. The method of claim 1, further comprising:
in response to receiving the request, sending the particular file to a recipient indicated in the request.

7. A method comprising:
receiving, at a client device, a composite report that includes composite data about a plurality of reports, each of which corresponds to different report data that was retrieved from a database;
while the client device is not connected to the database, the client device:
analyzing the composite data in the composite report to identify, for each report of the plurality of reports, executable identification data that identifies a location to retrieve an executable that is used to process report data that corresponds to said each report;
retrieving, over a network, based on first executable identification data in the composite data, a first executable;
executing the first executable against first report data, in the composite report, that corresponds to a first report of the plurality of reports and that is associated with the first executable to generate first display data;
causing the first display data to be displayed on a display screen of the client device;
retrieving, over the network, based on second executable identification data in the composite data, a second executable;
executing the second executable against second report data, in the composite report, that corresponds to a second report of the plurality of reports and that is associated with the second executable to generate second display data;
causing the second display data to be displayed on the display screen of the client device.

8. The method of claim 7, wherein the report data for each report of the plurality of reports is compressed prior to executing the first executable and the second executable.

9. The method of claim 8, further comprising:
prior to executing the first executable, decompressing the first report data to generate decompressed first report data without decompressing the second report data to generate decompressed second report data;
after causing the first display data to be displayed, decompressing the second report data to generate the decompressed second report data.

10. The method of claim 7, wherein:
analyzing the composite data comprises generating, at the client device, a set of mappings that includes at least a first mapping and a second mapping;
the first mapping associates the first report data with the first executable identification data;
the second mapping associates the second report data with the second executable identification data.

11. The method of claim 7, wherein:
each report of the plurality of reports corresponds to a different database feature;
the first report of the plurality of reports includes performance information regarding one or more of:
a plurality of monitored SQL executions, specific operations performed within a single monitored SQL execution, a plurality of database sessions, a plurality of SQL statements that use the most resources in the database, or a single SQL statement where the performance information includes two or more of resource usage, activity, execution plans, or monitored executions of the single SQL statement.

12. The method of claim 7, wherein:
the first report of the plurality of reports indicates first performance metrics that are associated with the database;
the second report of the plurality of reports indicates second performance metrics that are different than the first performance metrics and that are associated with the database.

13. The method of claim 7, wherein retrieving the second executable is performed in response to receiving input that indicates user selection of the second report.

14. One or more computer-readable media storing instructions which, when executed by one or more processors, cause:
receiving, at a database system, a request to generate a composite report based on data stored in a database;
in response to receiving the request, for each report of a plurality of reports:
retrieving, from the database, report data for said each report;
storing the report data for said each report in a particular file;
storing, in the particular file, in association with the report data for said each report, executable identification data that identifies a location for a cleint device to retrieve, over a network, an executable that is to be executed by the client device that is remote relative to the database system and that is configured to process the report data of said each report to display user interface data for said each report;
wherein the particular file includes the report data for each report of the plurality of reports;
wherein the particular file is to be processed by the client device that is not connected to the database.

15. The one or more computer-readable media of claim 14, wherein storing the report data for said each report in the particular file comprises:
compressing first report data for a first report of the plurality of reports to generate first compressed report data;
storing the first compressed report data in the particular file;
compressing second report data for a second report of the plurality of reports to generate second compressed report data that is different than the first compressed report data;
storing the second compressed report data in the particular file.

16. The one or more computer-readable media of claim 14, wherein storing the executable identification data comprises:
storing, in the particular file, in association with first report data for a first report of the plurality of reports, first executable identification data that identifies a location to retrieve a first executable that is configured to process the first report data;
storing, in the particular file, in association with second report data for a second report of the plurality of reports, second executable identification data that identifies a location to retrieve a second executable that is different than the first executable and that is configured to process the second report data.

17. The one or more computer-readable media of claim 14, wherein:
the plurality of reports includes a first report that corresponds to a first database feature;
the plurality of reports includes a second report that corresponds to a second database feature that is different than the first database feature.

18. The one or more computer-readable media of claim 17, wherein a particular report of the plurality of reports includes performance-related data regarding one or more of:
a plurality of monitored SQL executions, specific operations performed within a single monitored SQL execution, a plurality of database sessions, a plurality of SQL statements that use the most resources in the database, or a single SQL statement where the performance-related data includes two or more of resource usage, activity, execution plans, or monitored executions of the single SQL statement.

19. The one or more computer-readable media of claim 14, wherein the instructions, when executed by the one or more processors, further cause:
in response to receiving the request, sending the particular file to a recipient indicated in the request.

20. One or more computer-readable media storing instructions which, when executed by one or more processors, cause:
receiving, at a client device, a composite report that includes composite data about a plurality of reports, each of which corresponds to different report data that was retrieved from a database;
while the client device is not connected to the database, the client device:
analyzing the composite data in the composite report to identify, for each report of the plurality of reports, executable identification data that identifies a location to retrieve an executable that is used to process report data that corresponds to said each report;
retrieving, over a network, based on first executable identification data in the composite data, a first executable;
executing the first executable against first report data, in the composite report, that corresponds to a first report of the plurality of reports and that is associated with the first executable to generate first display data;
causing the first display data to be displayed on a display screen of the client device;
retrieving, over the network, based on second executable identification data in the composite data, a second executable;
executing the second executable against second report data, in the composite report, that corresponds to a second report of the plurality of reports and that is associated with the second executable to generate second display data;
causing the second display data to be displayed on the display screen of the client device.

21. The one or more computer-readable media of claim 20, wherein the report data for each report of the plurality of reports is compressed prior to executing the first executable and the second executable.

22. The one or more computer-readable media of claim 21, wherein the instructions, when executed by the one or more processors, further cause:
prior to executing the first executable, decompressing the first report data to generate decompressed first report data without decompressing the second report data to generate decompressed second report data;
after causing the first display data to be displayed, decompressing the second report data to generate the decompressed second report data.

23. The one or more computer-readable media of claim 20, wherein:
analyzing the composite data comprises generating, at the client device, a set of mappings that includes at least a first mapping and a second mapping;
the first mapping associates the first report data with the first executable identification data;
the second mapping associates the second report data with the second executable identification data.

24. The one or more computer-readable media of claim 20, wherein:
each report of the plurality of reports corresponds to a different database feature;
the first report of the plurality of reports includes performance information regarding one or more of:
a plurality of monitored SQL executions, specific operations performed within a single monitored SQL execution, a plurality of database sessions, a plurality of SQL statements that use the most resources in the database, or a single SQL statement where the performance information includes two or more of resource usage, activity, execution plans, or monitored executions of the single SQL statement.

25. The one or more computer-readable media of claim 20, wherein:
the first report of the plurality of reports indicates first performance metrics that are associated with the database;
the second report of the plurality of reports indicates second performance metrics that are different than the first performance metrics and that are associated with the database.

26. The one or more computer-readable media of claim 20, wherein retrieving the second executable is performed in response to receiving input that indicates user selection of the second report.

27. The method of claim 1, wherein:
a first report of the plurality of reports indicates first performance metrics that are associated with the database;
a second report of the plurality of reports indicates second performance metrics that are different than the first performance metrics and that are associated with the database.

28. The one or more computer-readable media of claim 14, wherein:
a first report of the plurality of reports indicates first performance metrics that are associated with the database;
a second report of the plurality of reports indicates second performance metrics that are different than the first performance metrics and that are associated with the database.

* * * * *

UNITED STATES PATENT AND TRADEMARK OFFICE
CERTIFICATE OF CORRECTION

PATENT NO. : 9,524,322 B2  Page 1 of 1
APPLICATION NO. : 14/040354
DATED : December 20, 2016
INVENTOR(S) : Yagoub et al.

It is certified that error appears in the above-identified patent and that said Letters Patent is hereby corrected as shown below:

In the Claims

In Column 15, Line 38, in Claim 14, delete "cleint" and insert -- client --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*